Figure 1:
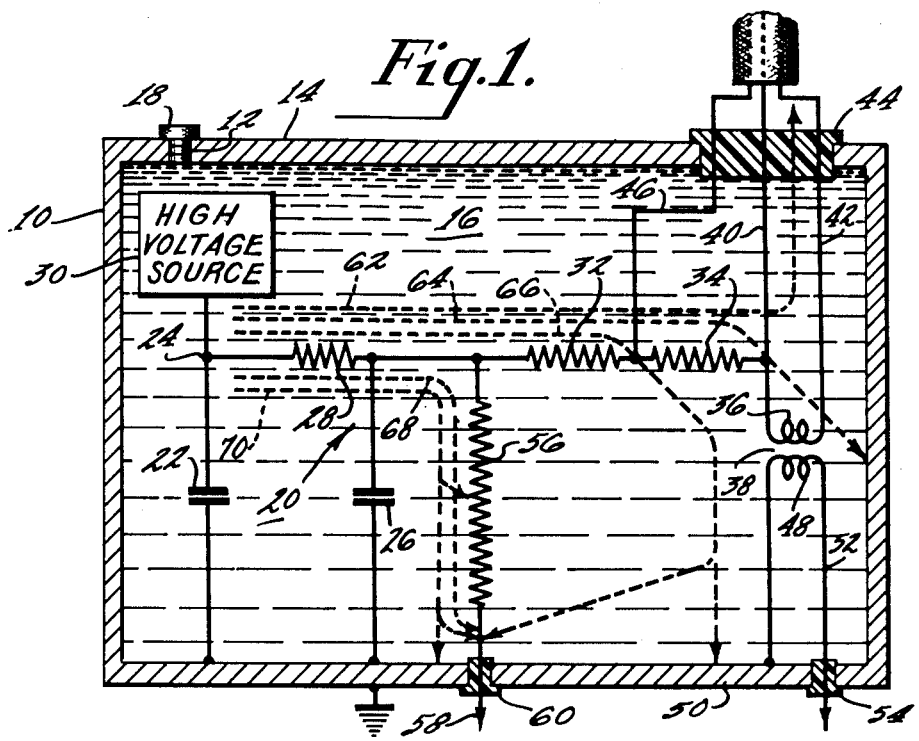

July 24, 1956

J. H. REISNER 2,756,350

VOLTAGE STABILIZATION MEANS FOR
HIGH VOLTAGE POWER SUPPLIES

Filed Oct. 28, 1953

INVENTOR
John H. Reisner
BY
ATTORNEY

United States Patent Office

2,756,350
Patented July 24, 1956

2,756,350
VOLTAGE STABILIZATION MEANS FOR HIGH VOLTAGE POWER SUPPLIES

John H. Reisner, Haddonfield, N. J., assignor to Radio Corporation of America, a corporation of Delaware Application October 28, 1953, Serial No. 388,825

10 Claims. (Cl. 307—91)

This invention relates generally to high voltage power supplies, and more specifically to voltage stabilization means for high voltage power supplies wherein a portion of its circuitry is contained in a tank filled with a dielectric fluid.

While neither specifically nor exclusively limited thereto, the voltage stabilization means of the present invention are particularly useful in the high voltage supplies usually used with an electron microscope. The voltage stabilization means of the present invention are particularly applicable to the power supplies described in Patent Numbers 2,302,900 and 2,355,191, issued to A. W. Vance on November 24, 1942, and August 8, 1944, respectively, and assigned to the assignee of the present invention.

The components of some high voltage power supplies are immersed in a tank filled with a dielectric fluid in order to prevent a voltage breakdown between points across which there exists a high potential difference. In some high voltage power supplies used in connection with some electron microscopes, for example, the rectifying and doubler circuit, the filter network, the surge resistor, the bias resistor for the cathode ray tube, and other components are immersed in a dielectric fluid contained in a grounded tank. Circulation of the dielectric fluid, probably due to its ionization, occurs under the influence of the strong electrostatic fields that surround this portion of the circuitry of the high voltage power supply. Accompanying the dielectric fluid flow, and perhaps causing it, there is a transport of electrical charges. It is evident that this transport of electrical charges reaches a magnitude of several microamperes in a power supply using greater than the minimum safe spacings between components of the power supply. This transport of electrical charges is sporadic and fluctuating and has a deleterious effect upon the stability of a high impedance output circuit of the type employed with electron microscope power supplies. Firstly, the dielectric fluid transported electrical charges cause a fluctuating leakage current to flow in paths parallel to the load, and thereby develop fluctuating voltages across such impedances that they hold in common with the load. Secondly, the circulating dielectric fluid transported electrical charges produce a fluctuating conductance across the feedback resistor, which is also immersed in the dielectric fluid, and cause irregularities in the fed back voltage regulating signal.

High voltage power supplies, of the type used to supply power for an electron microscope, have regulated output voltages in the neighborhood between 50,000 and 100,000 volts. The maximum variation in output voltage permissible is about four volts for these supplies in order to insure good resolution of the microscope image. It has been found, however, that the sporadic and fluctuating leakage currents in the dielectric fluid of these power supplies will cause a variation of as much as 50 to 100 volts in the output voltage.

Accordingly, it is a principal object of the present invention to provide improved voltage stabilization means for high voltage power supplies which will overcome the aforementioned objections and disadvantages.

Another object of the present invention is to provide improved voltage stabilization means, for high voltage power supplies having a portion of its circuitry immersed in a tank filled with a dielectric fluid, by eliminating fluid transported electrical currents adjacent circuit components of relatively high impedance.

A further object of the present invention is to provide improved voltage stabilization means for high voltage power supplies of the type described by surrounding the high impedance elements in a dielectric fluid filled tank with an electrode in a manner whereby the potential difference between the surrounded elements and the electrode is insufficient to cause ionization and leakage currents therebetween.

It is a still further object of the present invention to provide improved voltage stabilization means for high voltage power supplies of the type described which are simple in structure, easy to adapt to existing power supplies, and highly efficient in use.

These and further objects of the present invention are attained in improved voltage stabilization means for high voltage power supplies of the type wherein a portion of the high voltage circuit is contained in a tank filled with a dielectric fluid. The voltage stabilization means of the present invention will be described in connection with the aforementioned Vance patents, for the sake of simplicity. It should be understood, however, that the voltage stabilization means of the present invention may be incorporated in any high voltage power supply wherein a dielectric fluid filled tank is used as a part thereof. The portion of the high voltage power supply usually contained within the dielectric fluid in the tank is the rectifier circuit, the filter network, a surge resistor, a bias resistor and a filament transformer for the cathode ray tube used in the electron microscope. Since these power supplies are usually regulated, a feedback resistor is also included within the tank and is usually connected into the high voltage circuit between the filter network and the surge resistor. Because the tank is usually grounded, the very high potential that exists between the components, or elements, within the tank and the walls thereof will ordinarily cause leakage currents to flow between the high impedance elements within the tank and the walls of the tank. In accordance with the present invention, the high impedance elements within the tank, namely, the resistor of the filter network, the surge resistor, the bias resistor and the secondary of the filament transformer are surrounded by an electrically conductive electrode in spaced relationship to the surrounded elements. The electrode is connected to a point of potential at least as high as any on the surrounded circuit. For maximum voltage stabilization, the electrode will be connected to the output of the high voltage rectifiers since a capacitor of the filter network is connected between this high voltage output and ground, thereby furnishing a low impedance path to ground for any currents that may flow in the electrode. Even though the space between the electrode and the high impedance components surrounded thereby may be filled with the dielectric fluid, the potential difference between these components and the electrode is now relatively much lower than the potential difference between the components and the walls of the tank, and, consequently, no currents will flow in the dielectric fluid between the electrode and the components surrounded thereby. This arrangement prevents the circulation of ionized charged particles in the neighborhood of the high impedance components and thereby eliminates the leakage currents usually responsible for the instability of power supplies having a portion of its circuitry immersed in a dielectric fluid.

Figure 2:
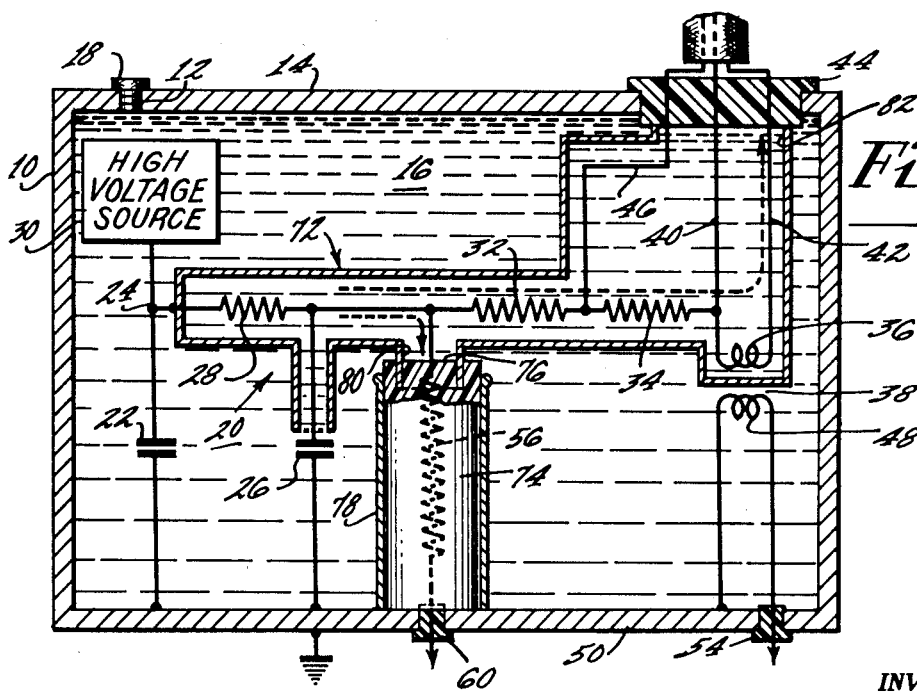

The novel features of the present invention, as well as the invention itself, both as to its organization and method of operation will be understood in detail from the following description when considered in connection with the accompanying drawing, in which similar reference numerals refer to similar elements, and in which:

Fig. 1 is a side elevational view of a tank, in cross-section, filled with a dielectric fluid, showing the leakage currents associated with the various components of a portion of a power supply circuit, represented schematically, immersed within the dielectric fluid, and Fig. 2 is a view similar to that of Fig. 1, showing the voltage stabilization means, in cross-section connected to the portion of the power supply circuit within the tank, in accordance with the present invention.

Referring now, particularly to Fig. 1, there is shown a metallic tank 10, a prismatic shape, formed with a threaded opening 12 in the upper wall 14 thereof, for the purpose of filling the tank with a dielectric fluid 16. A screw 18 is engaged with the threaded opening 12 for sealing the tank 10. The tank 10 is grounded. Immersed within the dielectric fluid 16 is a portion of the high voltage power supply of the type described in the aforementioned Vance patents. This portion of the high voltage power supply comprises a π-filter network 20 comprising a first low impedance or capacitor 22 having one end connected to ground and the other end connected to a terminal 24. A second low impedance element or capacitor 26 of the network 20 has one terminal connected to ground and the other terminal connected to the capacitor 22 through a high impedance element or resistor 28. A source of unidirectional high voltage 30, of the type described in the aforementioned Vance patents, is adapted to be connected to the filter network 20 through the terminal 24. The portion of the high voltage source 30 within the tank 10 may be the rectifier and voltage doubler circuit of a typical radio frequency high voltage power supply of the type described in the Vance patents. A surge resistor 32, a bias resistor 34 and a secondary winding 36 of a filament transformer 38 are connected in series with each other and with the resistor 28. The resistors 32 and 34 and the secondary winding 36 of the transformer 38 are elements of relatively high impedance compared to the capacitors 22 and 26. The bias resistor 34 furnishes self bias for the cathode ray tube (not shown) of an electron microscope. Leads 40 and 42 from the secondary winding 36 of the filament transformer 38 extend through an output bushing or insulator 44 fixedly inserted in the upper wall 14 of the tank 10, for the purpose of heating the filament in the electron gun of the cathode ray tube (not shown). A lead 46 connected between the surge resistor 32 and bias resistor 34 also extends through the insulator 44 for connection to the grid of the cathode ray tube (not shown). One end of the primary winding 48 of the transformer 38 is connected to the bottom wall 50 of the tank 10, and the other end is connected to an oscillator circuit through a lead 52 extending through an insulator 54 fixed in the bottom wall 50 of the tank 10. The primary winding 48 of the filament transformer 38 is connected to a source of high frequency oscillations (not shown) as taught in the aforementioned Vance patents.

Sample voltages for regulatory purposes of the power supply are taken through a feedback resistor 56 having one end connected between the resistors 28 and 32, and the other end connected to a driver oscillator (not shown) of the high voltage source 30, through a typical regulatory circuit (not shown), as for example, the regulatory circuit of the Vance patents. The lead 58 from the resistor 56 extends through an insulator 60 fixed within the bottom wall 50 of the tank 10.

The various normal and stray currents that may exist within the dielectric fluid 16 are represented diagrammatically by the dashed lines 62, 64, 66, 68 and 70. The dashed line 62 represents the current into the load (not shown). The dashed line 64 represents the dielectric fluid transported current from the surfaces beyond the bias resistor 34 to ground. The dashed line 66 is the leakage current from the fluid immersed area between the surge resistor 32 and the bias resistor 34. The dashed line 68 is the current in the feedback circuit, and the dashed line 70 is the fluid transported leakage current from all areas between the resistor 28 and the surge resistor 32 to ground.

If it is assumed that the voltage at the junction between the resistors 28 and 32 is held constant by the regulatory action of the power supply, the fluctuations in the output voltage in the load, that is, in the cathode ray tube (not shown) may be as much as 50 to 100 volts due to the drop in resistors 32 and 34 caused by the fluctuation leakage currents 64 and 66. In cases where the power supply is used for supplying energy to an electron microscope, the maximum fluctuation permissible for good resolution is about four volts.

Voltage stabilization means are provided, in accordance with the present invention, to eliminate excessive fluctuations in the output voltage of a high voltage power supply of the type described. To this end, a casing-like electrode 72, shown in cross-section in Fig. 2, is formed to surround the high impedance elements of portions of the high voltage power supply circuit between the high voltage source 30 and the load (not shown). The electrode 72 comprises a metallic shield or casing of metal such as brass, copper, and the like. The electrode 72 could also be made of metallic screen material. The electrode 72 surrounds the high impedance resistor 28 of the filter network 20, the surge resistor 32, the bias resistor 34, the primary winding 32 of the filament transformer 38, and the electrical connections between these components. The electrode 72 is spaced from these components, and the spaces therebetween may be filled with the dielectric fluid 16. The electrode 72 is electrically connected to a point of potential, of the high voltage power supply circuit, which is at least as high as any on the circuit surrounded by the electrode 72. In the embodiment of the invention shown in Fig. 2, the electrode 72 is electrically connected to the terminal 24 which is the point of highest voltage in the high voltage power supply. The electrode 72 is also connected to ground through an element of relatively low impedance, namely, the capacitor 22.

In a preferred embodiment of the present invention shown in Fig. 2, the feedback resistor 56 is surrounded by a solid dielectric material 74, which may be of cylindrical shape, having a top wall 76. The cylindrical surface of the solid dielectric material 74 may be encased in a metallic shield 78 grounded to the bottom wall 50 of the tank 10. Any opening in the casing or electrode 72, necessitated by the passage of an electrical connection therethrough, is made to abut on a solid dielectric surface in order to prevent circulating currents of the dielectric fluid 16 and thereby eliminate, or minimize, undesirable leakage currents. To this end, the electrode 72 has an opening 80 therein which abuts on the top wall 76 of the solid dielectric 74. The electrode 72 also has an opening 82 abutting on the lower surface of the insulated output bushing 44. Thus, it is seen that the electrode 72, connected to a point of higher potential than any potential along the circuit it encloses, provides an arrangement whereby the difference in potential between the electrode 72 and any part of the enclosed components, or connections thereto, is relatively much smaller than the difference in potential between the enclosed components and the walls of the grounded tank 10. Since a voltage of a few thousand volts is necessary to cause appreciable circulation of the dielectric fluid 16, and since the difference in potential between the electrode 72 and the components which it encloses is relatively much smaller, no appreciable circulation of dielectric fluid 16 exists within the volume enclosed by the electrode 72. By eliminating the circulation of dielectric fluid in the vicinity of the high impedance elements, the transport of electrical charges in this vicinity is also eliminated, and, consequently, the leakage currents causing the fluctuation in the output power supply are either eliminated or markedly reduced.

It is noted that the portion of the electrode surrounding the secondary winding 36 of the filament transformer 38 should be of a metal such as copper or brass rather than a ferrous metal in order to prevent interference with the magnetic coupling in the transformer 38. While the embodiment of the present invention shown in Fig. 2 illustrates an electrode 72 which encloses substantially all of the high impedance elements in a portion of a fluid immersed circuit of a high voltage power supply, it is obvious that the electrode 72 may enclose a smaller number of high impedance elements. In the latter case, the electrode 72 would be connected to a point of potential in the circuit which is at least as high, as any point of voltage along the circuit enclosed by the electrode 72.

Thus, there has been shown and described in accordance with the objects of the present invention, voltage stabilization means for use in high voltage power supplies employing a tank for containing a portion of its circuitry immersed in a dielectric fluid. By surrounding the high impedance elements of the filter network, the surge resistor, the bias resistor, a portion of the filament transformer, and their connecting leads with a metallic shield, and by connecting the shield to a point of voltage at least as high as any point along the circuit enclosed, the difference of potential between the electrode and the enclosed circuit is reduced to a point which will not cause ionization of the dielectric fluid in the spaces between the electrode and the enclosed circuit. Also by having the openings in the surrounding electrode, through which the leads from portions of the enclosed circuit pass, abut solid dielectric surfaces, the dielectric fluid within the electrode is prevented from circulating. Through use of the voltage stabilization means of the present invention, a high voltage power supply of the radio frequency type can be stabilized sufficiently so that an electron microscope powered by it will produce images of acceptable resolution.

What is claimed is:

1. In a power supply of the type comprising a source of unidirectional voltage, a filter network comprising an element of relatively low impedance connected across said source, elements of relatively higher impedance connected in circuit with said network, and a tank filled with a dielectric fluid and containing said elements; the combination therewith of an electrode surrounding said higher impedance elements and electrically connected to said element of relatively low impedance.

2. In a power supply of the type comprising a source of unidirectional voltage, a filter network comprising an element of relatively low impedance connected across said source, elements of relatively higher impedance connected in circuit with said network, and a tank filled with a dielectric fluid and containing said elements; the combination therewith of an electrode surrounding said higher impedance elements and electrically connected to said element of relatively low impedance, said last-mentioned element comprising a capacitor.

3. In a power supply of the type comprising a source of unidirectional voltage, a filter network comprising an element of relatively low impedance connected across said source, elements of relatively higher impedance connected in circuit with said network, and a tank filled with a dielectric fluid and containing said elements; the combination therewith of an electrode surrounding said higher impedance elements and electrically connected to said element of relatively low impedance, said last-mentioned element comprising a capacitor, and said higher impedance elements comprising a plurality of resistors connected in series with each other.

4. In a power supply of the type comprising a source of unidirectional voltage, a filter network comprising an element of relatively low impedance connected across said source, elements of relatively higher impedance connected in circuit with said network, and a tank filled with a dielectric fluid and containing said elements; the combination therewith of an electrode surrounding said higher impedance elements and electrically connected to said element of relatively low impedance, said last-mentioned element comprising a capacitor, and said higher impedance elements comprising a plurality of resistors and a transformer winding connected in series with each other.

5. In a power supply of the type comprising a source of unidirectional voltage, a filter network comprising an element of relatively low impedance connected across said source, elements of relatively higher impedance connected in circuit with said network, and a tank filled with a dielectric fluid and containing said elements; the combination therewith of an electrode surrounding said higher impedance elements and electrically connected to said element of relatively low impedance, said electrode being spaced from said impedances and said fluid filling the spaces therebetween.

6. In a high voltage power supply of the type wherein a source of unidirectional voltage is connected to a load through circuit means comprising a plurality of components, said circuit means being immersed in a dielectric fluid contained in a tank; the combination therewith of an electrode surrounding some of said components, said electrode being connected to said circuit means at a point of potential at least as high as any on said circuit means surrounded by said electrode.

7. In a high voltage power supply of the type wherein a source of unidirectional voltage is connected to a load through circuit means comprising a plurality of components, said circuit means being immersed in a dielectric fluid contained in a tank; the combination therewith of an electrode surrounding some of said components, said electrode being connected to said circuit means at a point of potential at least as high as any on said circuit means surrounded by said electrode, and said electrode being spaced from said circuit means and said dielectric fluid filling the spaces therebetween.

8. In a high voltage power supply of the type wherein a source of unidirectional voltage is connected to a load through circuit means comprising a plurality of components, said circuit means being immersed in a dielectric fluid contained in a tank; the combination therewith of an electrode surrounding some of said components, said electrode being connected to said circuit means at a point of potential at least as high as any on said circuit means surrounded by said electrode, said components comprising a filter network having a capacitor connected across said source, and said electrode surrounding a portion of said network.

9. In a high voltage power supply of the type wherein a source of unidirectional voltage is connected to a load through circuit means comprising a plurality of components, said circuit means being immersed in a dielectric fluid contained in a tank; the combination therewith of an electrode surrounding some of said components, said electrode being connected to said circuit means at a point of potential at least as high as any on said circuit means surrounded by said electrode, said components comprising a filter network, a bias resistor, and a surge resistor connected between said network and said bias resistor.

10. In a hgih voltage power supply of the type wherein a source of unidirectional voltage is connected to a load through circuit means comprising a plurality of components, said circuit means being immersed in a dielectric fluid contained in a tank; the combination therewith of an electrode surrounding some of said components, said electrode being connected to said circuit means at a point of potential at least as high as any on said circuit means surrounded by said electrode, said components comprising a filter network, a bias resistor, a surge resistor connected between said network and said bias resistor, and a transformer winding connected to said bias resistor.

References Cited in the file of this patent

UNITED STATES PATENTS 1,748,499    Senauke _____ Feb. 25, 1930